US008009337B2

(12) United States Patent
Kubo et al.

(10) Patent No.: US 8,009,337 B2
(45) Date of Patent: Aug. 30, 2011

(54) IMAGE DISPLAY APPARATUS, METHOD, AND PROGRAM

(75) Inventors: Manabu Kubo, Tokyo (JP); Takashi Tsujimura, Tokyo (JP); Masatsugu Fukunaga, Kanagawa (JP); Daisuke Miyakoshi, Kanagawa (JP); Nobuho Ikeda, Kanagawa (JP); Kyoko Fukuda, Kanagawa (JP); Yutaka Yoneda, Kanagawa (JP)

(73) Assignee: Sony Corporation, Tokyo (JP)

( * ) Notice: Subject to any disclaimer, the term of this patent is extended or adjusted under 35 U.S.C. 154(b) by 1212 days.

(21) Appl. No.: 11/608,951

(22) Filed: Dec. 11, 2006

(65) Prior Publication Data

US 2007/0146810 A1    Jun. 28, 2007

(30) Foreign Application Priority Data

Dec. 27, 2005  (JP) ................................. 2005-374681

(51) Int. Cl.
    *H04N 1/46*    (2006.01)
(52) U.S. Cl. ......... 358/505; 345/55; 345/77; 348/207.1; 348/208.16
(58) Field of Classification Search .................. 358/448, 358/505; 345/55–80; 348/135–160
    See application file for complete search history.

(56) References Cited

U.S. PATENT DOCUMENTS

| | | | | |
|---|---|---|---|---|
| 5,812,189 A | * | 9/1998 | Kimura et al. | 348/240.99 |
| 2004/0052513 A1 | * | 3/2004 | Ohkawara et al. | 396/55 |
| 2005/0253878 A1 | * | 11/2005 | Kubo et al. | 345/698 |
| 2006/0072018 A1 | * | 4/2006 | Inaba et al. | 348/208.99 |
| 2006/0140600 A1 | * | 6/2006 | Suda | 396/52 |

FOREIGN PATENT DOCUMENTS

| | | |
|---|---|---|
| JP | 3406924 | 3/2003 |
| JP | 2005-326528 | 11/2005 |

* cited by examiner

*Primary Examiner* — Twyler L Haskins
*Assistant Examiner* — Marcellus Augustin
(74) *Attorney, Agent, or Firm* — Oblon, Spivak, McClelland, Maier & Neustadt, L.L.P.

(57) ABSTRACT

An image display apparatus having an electronic zoom function. The apparatus includes: imaging means capable of changing a start position of reading an image; in order for at least a part of a predetermined range of the image data to be written at the time of reading the image from a memory, writing means for extracting the predetermined range of the image and writing the extracted image in the memory; reading means for starting to read the image in the memory at the time of reading the image, converting the predetermined range of the image read from the memory into an image of a predetermined resolution, and outputting the image; and when the range of the image read is wider than a range to be expanded, control means for controlling the start position of reading so as to narrow the range of the image to be read.

5 Claims, 16 Drawing Sheets

IMAGE DISPLAY APPARATUS, METHOD, AND PROGRAM

CROSS REFERENCES TO RELATED APPLICATIONS

The present invention contains subject matter related to Japanese Patent Application JP 2005-374681 filed in the Japanese Patent Office on Dec. 27, 2005, the entire contents of which are incorporated herein by reference.

BACKGROUND OF THE INVENTION

1. Field of the Invention

The present invention relates to an image display apparatus, method, and program. More particularly, the present invention relates to an image display apparatus, method, and program capable of preventing a decrease in the maximum expansion rate by shortening the timing of reading from a memory and outputting an image to be expanded by an electronic zoom function.

2. Description of the Related Art

To date, an imaging apparatus for converting an image into an electronic signal, such as a video camera, for example, is additionally provided with a function of camera shake compensation, electronic zooming, etc.

Here, camera shake compensation is to obtain camera-shake information of the cameraman of a video camera by a gyro-sensor, etc., to cut out a portion of an image on the basis of the information, and to perform interpolation processing on the pixel values using adjacent pixel values in order to electronically expand or shrink the cut-out portion to an image of a standard angle of view. Also, electronic zooming is to cut out a portion of an image, and to perform interpolation processing on the pixel values using adjacent pixel values in order to electronically expand the cut-out portion to an image of a standard angle of view.

FIG. 1 is an example of a timing chart showing the address transition of an image memory for consecutive three screens and the input/output timing of images at full-screen display time in a known image display apparatus.

FIG. 1 shows a state of converting the resolution from an input image of horizontal 1920 pixels×vertical 540 lines into an output image of horizontal 1440 pixels×vertical 540 lines.

The image memory includes a ring buffer, the writing of data into the image memory is denoted by broken lines, and the reading of the written data is denoted by solid lines. The image memory is, for example, a memory in which the image obtained by converting the number of pixels of an input image in the lateral direction is written. The image written in the image memory is read from the image memory, then is appropriately subjected to the conversion of the number of lines in the vertical direction, and the obtained image is output as an output image.

The address of the image memory starts from 0, and the write address of the next line is obtained by incrementing for one line for each writing of one line. When the address reaches the end of the image memory, the write address of the next line is returned to 0 as shown in the figure, and then the write address is continued to be incremented for one line for each writing of one line again. The address to be the location of writing data is held after the completion of the processing for one screen, and the processing (writing) of the next screen is continued from the held address.

An input synchronization signal and an output synchronization signal are produced in synchronism with each other. While an image is being written into the image memory, the image of 1V before that image being written is read from the image memory. That is to say, for example, the image 1 written in the image memory during the period (t11 to t12) is subjected to the resolution conversion and read from the image memory during the period (t13 to t14) with a delay of 1V. During the period (t13 to t14), the writing of the image 2 of the next screen is carried out simultaneously. In the same manner, the image 2, which is one screen before the image 3, is read simultaneously with the writing of the image 3 during the period (t15 to t16).

FIG. 2 is a diagram illustrating the state in which the central part of the screen of an input image including horizontal 1920 pixels×vertical 540 lines, that is to say, a part including horizontal 1600 pixels×vertical 450 lines is specified for an effective range, and is resolution converted into an output image including horizontal 1440 pixels×vertical 540 lines as an example of the operation for the sake of camera shake compensation in a known image display apparatus.

Also, FIG. 3 shows the address transition of the image memory and the input/output timing of the image when the effective range is changed in sequence from horizontal 1600 pixels×vertical 450 lines (upper part of the screen), horizontal 960 pixels×vertical 270 lines (central part of the screen), and horizontal 1600 pixels×vertical 450 lines (lower part of the screen) as another example of the operation for the sake of camera shake compensation in a known image display apparatus.

In the examples of the operations in FIGS. 2 and 3, similarly as the example of the operation in FIG. 1, the input synchronization signal and the output synchronization signal are produced in synchronism with each other. While an image is being written into the image memory, the image of 1V before that image is read from the image memory. In these examples, although the writing period of an input image changes corresponding to the line position of the effective-range image, the reading period is the same, and the images are always output at constant output timing.

SUMMARY OF THE INVENTION

In a known image display apparatus, it has been necessary for the image memory storing an input image temporarily to have a storage capacity for at least one screen (field or frame). Accordingly, for example, if the luminance signal and the color difference signal for one field of a high-definition television (HD) screen image are individually stored by eight bits, it is necessary to have about 12 Mbits for the storage capacity without change, and thus not only the image memory becomes large but also the apparatus becomes expensive.

Thus, the technique for saving the storage capacity of the image memory by providing a compression-coding circuit at the input side of the image memory and providing an expansion-decoding circuit at the output side of the image memory, and a method of controlling the quantization coefficient at compression time by the electronic zooming magnification have been disclosed (refer to Japanese Patent No. 3406924).

With such a configuration, it is possible to reduce a part of the necessary capacity of the image memory to a certain extent, whereas it becomes necessary to add circuits, such as a compression-coding circuit, an expansion-decoding circuit, etc. Moreover, the image quality is deteriorated considerably by being subjected to the compression processing. In particular, when electronic zoom is used, the image quality is further deteriorated together with the image deterioration by the electronic zoom itself.

The present invention has been made in view of these circumstances. For example, it is desirable to reduce the capacity of the image memory which is necessary for resolution conversion. Also, it becomes possible to prevent a decrease in the maximum expansion rate caused by the reduction (by shortening the timing of reading the output image from the memory) of the capacity of the image memory.

According to an embodiment of the present invention, there is provided an image display apparatus having an electronic zoom function for expanding and displaying a part of an entire captured image, the image display apparatus comprising: imaging means capable of changing a start position of reading the image; in order for at least a part of a predetermined range of data based on the center of the entire image to be written at the time of reading the image from a memory, writing means for extracting the predetermined range of the image out of the image read by the imaging means and input as a capturing result, and writing the extracted image in the memory; reading means for starting to read the image written in the memory by the writing means at the time of the reading of the image, converting the predetermined range of the image read from the memory into an image of a predetermined resolution, and outputting the image; and when the range of the image read by the reading means is wider than a range to be expanded and displayed, control means for controlling the start position of reading by the imaging means so as to narrow the range of the image to be read.

The image display apparatus according to the embodiment may further include exposure-time control means for controlling maximum exposure time before and after transition while a start position of reading by the imaging means is controlled by the control means.

In the image display apparatus according to the embodiment, an input synchronization signal for an input image and an output synchronization signal for an image output by the reading means are asynchronous with each other, and assuming the input synchronization signal is V, the output synchronization signal may be output with a (1/3)V delay with respect to the input synchronization signal.

According to an embodiment of the present invention, there is provided a program for causing a computer to execute image processing in an image display apparatus having an electronic zoom function for expanding and displaying a part of an entire captured image, the image processing including the steps of: changing a start position of reading the image; in order for at least a part of a predetermined range of data based on the center of the entire image to be written at the time of reading the image from a memory, extracting the predetermined range of image out of the image read and input as a capturing result, and writing the extracted image in the memory; starting to read the image written in the memory by the writing means at the time of the reading of the image, converting the predetermined range of the image read from the memory into an image of a predetermined resolution, and outputting the image; and when the range of the image read is wider than a range to be expanded and displayed, controlling the start position of reading so as to narrow the range of the image to be read.

In an embodiment of the present invention, when the range of the image read is wider than a range to be expanded and displayed, the start position of reading by the imaging means is controlled so as to narrow the range of the image to be read.

By the present invention, it is possible to prevent the decrease of the maximum expansion rate.

DESCRIPTION OF THE PREFERRED EMBODIMENTS

In the following, a description will be given of an embodiment of the present invention. The relationship between the constituent features of the present invention and the embodiment described in the specification or the drawings is exemplified as follows. This description is for confirming that an embodiment supporting the present invention is included in the specification or the drawings. Accordingly, if there is an embodiment included in the specification or the drawings, but not included here as an embodiment corresponding to the constituent features, the fact does not mean that the embodiment does not corresponds to the constituent features. On the contrary, if an embodiment is included here as constituent features corresponding to the present invention, the fact does not mean the embodiment does not correspond to the features other than the constituent features.

Figure 1:
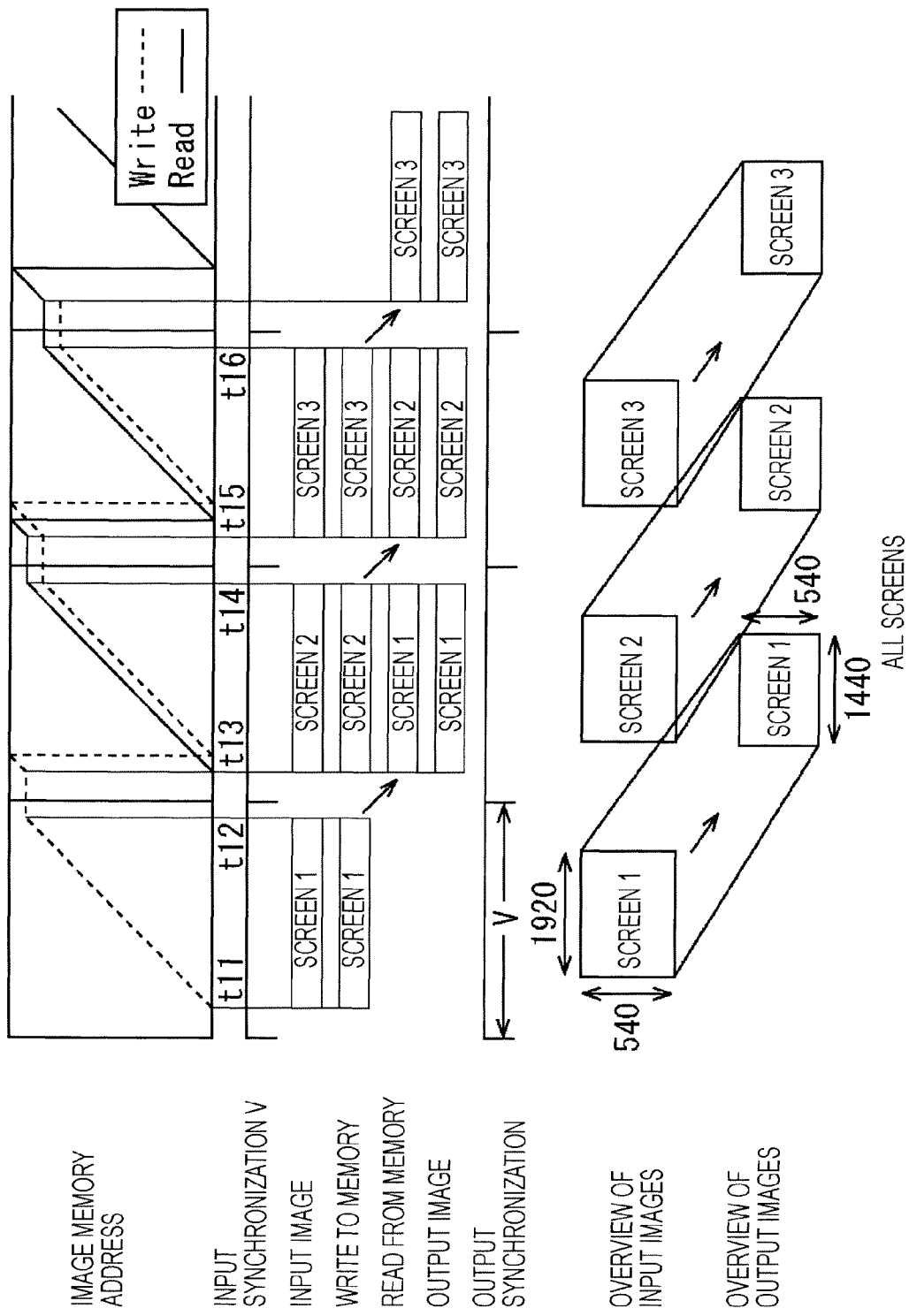
FIG. 1 is a timing chart showing the address transition of an image memory and the input/output timing of images for illustrating an operation of a known image display apparatus.
Figure 2:
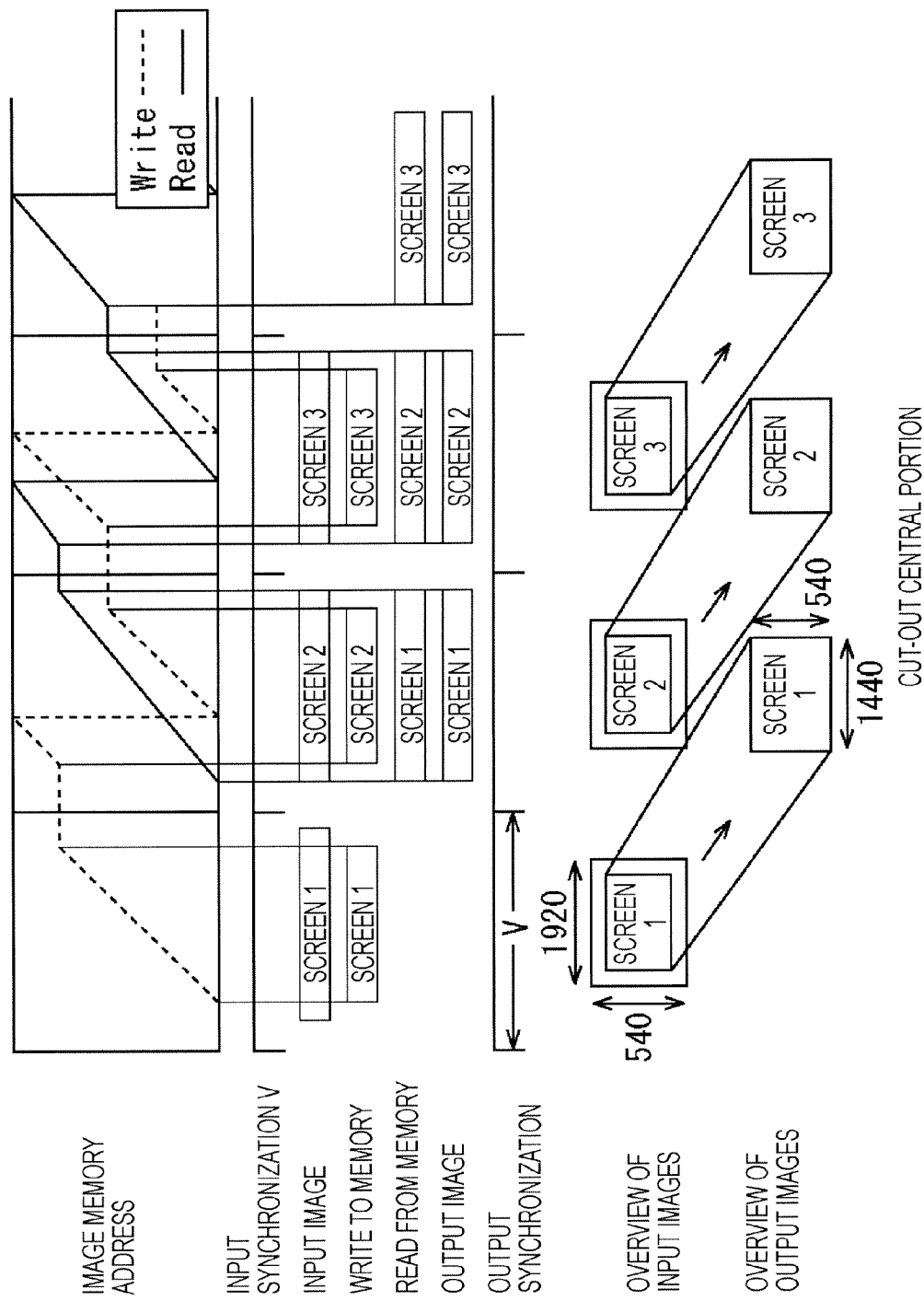
FIG. 2 is a timing chart showing the address transition of an image memory and the input/output timing of images for illustrating another operation of a known image display apparatus.
Figure 3:
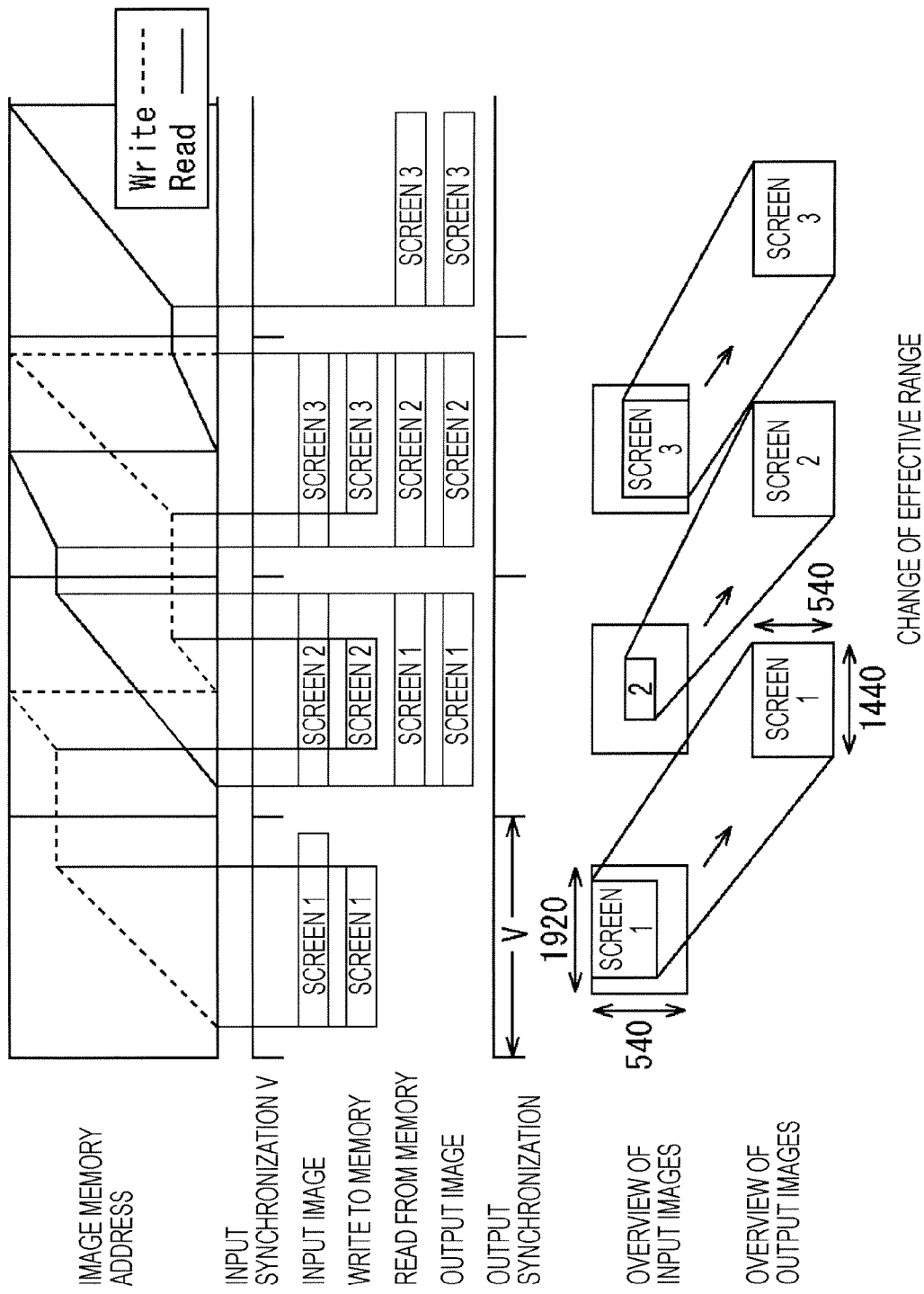
FIG. 3 is a timing chart showing the address transition of an image memory and the input/output timing of images for illustrating still another operation of a known image display apparatus.
Figure 4:
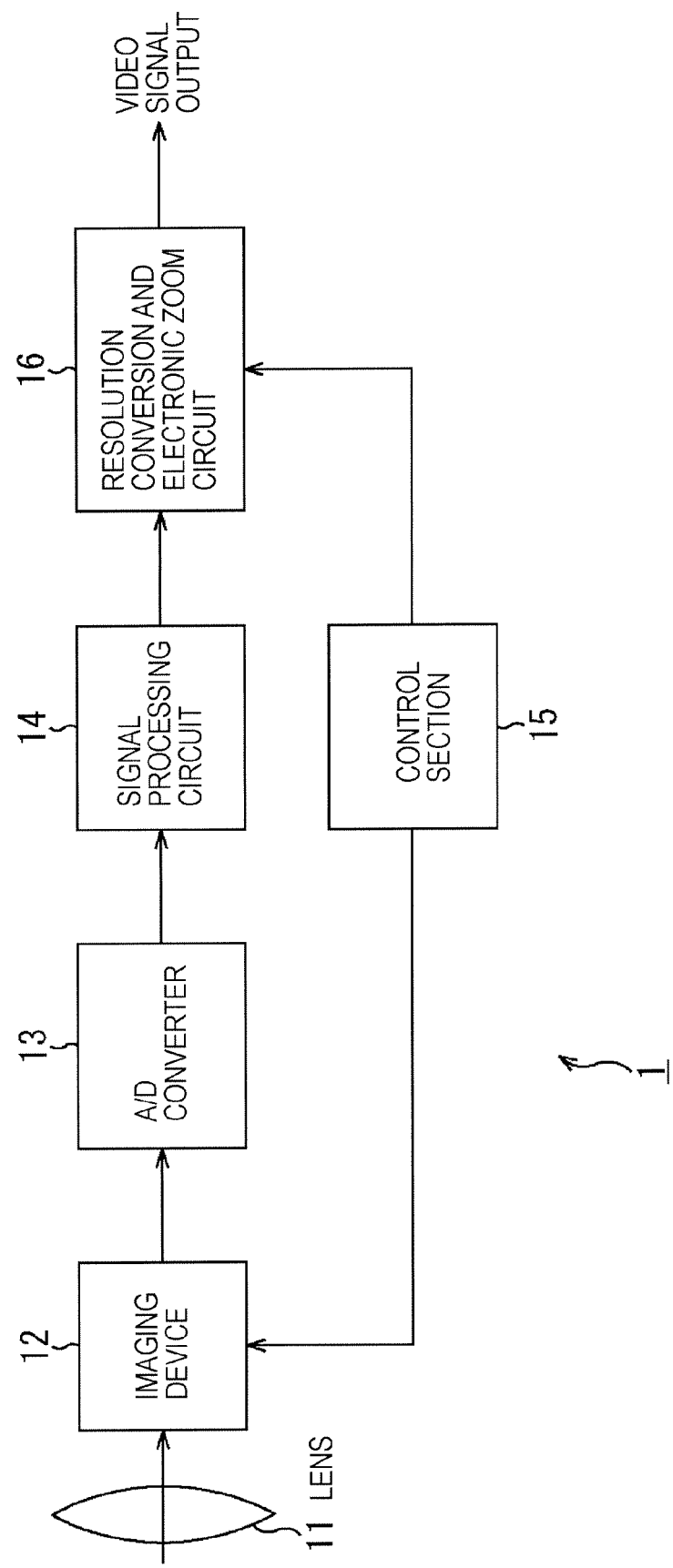
FIG. 4 is a schematic configuration diagram of an image display apparatus 1 according to an embodiment of the present invention.
Figure 5:
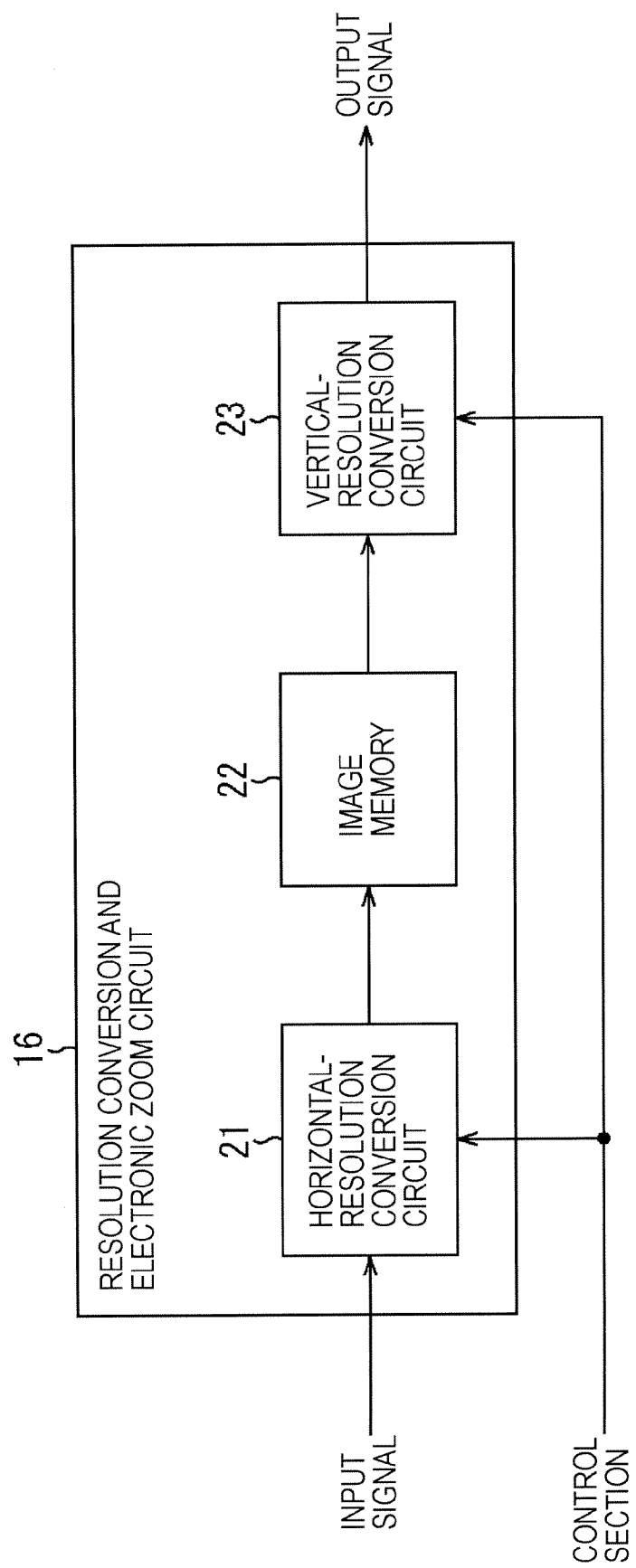
FIG. 5 is a block diagram showing an example of the configuration of a resolution conversion section 16 according to the present invention.

According to an embodiment of the present invention, there is provided an image display apparatus (for example, the image display apparatus 1 of FIG. 4) having an electronic zoom function for expanding and displaying a part of an entire captured image, the image display apparatus comprising: imaging means (for example, the imaging device 12 in FIG. 4) capable of changing a start position of reading the image; in order for at least a part of a predetermined range of data based on the center of the entire image to be written at the time of reading the image from a memory, writing means (for example, the horizontal-resolution conversion circuit 21 in FIG. 5) for extracting the predetermined range of the image out of the image read by the imaging means and input as a capturing result, and writing the extracted image in the memory; reading means (for example, the vertical-resolution conversion circuit 23 in FIG. 5) for starting to read the image written in the memory by the writing means at the time of the reading of the image, converting the predetermined range of the image read from the memory into an image of a predetermined resolution, and outputting the image; and when the range of the image read by the reading means is wider than a range to be expanded and displayed, control means (for example, the control section 15 in FIG. 4) for controlling the start position of reading by the imaging means so as to narrow the range of the image to be read.

This image display apparatus may further include exposure-time control means (for example, the control section 15 in FIG. 4) for controlling maximum exposure time before and after transition while a read-start position by the imaging means is controlled by the control means.

According to an embodiment of the present invention, there is provided a program for causing a computer to execute image processing in an image display apparatus having an electronic zoom function for expanding and displaying a part of an entire captured image, the image processing including the steps of: changing a start position of reading the image; in order for at least a part of a predetermined range of data based on the center of the entire image to be written at the time of reading the image from a memory (for example, the timing at which (1/3)V passes from the input image), extracting the predetermined range of the image out of the image read and input as a capturing result, and writing the extracted image in the memory (for example, step S1 in FIG. 15); starting to read the image written in the memory by the writing means at the time of the reading of the image, converting the predetermined range of the image read from the memory into an image of a predetermined resolution (for example, step S3 in FIG. 15), and outputting the image; and when the range of the image read is wider than a range to be expanded and displayed, controlling the start position of reading so as to narrow the range of the image to be read.

In the following, a description will be given of an embodiment of the present invention with reference to the drawings.

FIG. 4 is a schematic configuration diagram of an image display apparatus 1 according to an embodiment of the present invention.

In the present embodiment, an example of the application to a digital video camera is shown as an image display apparatus 1. The image display apparatus 1 includes a lens 11, an imaging device 12, an A/D (Analog/Digital) converter 13, a signal processing circuit 14, a control section 15, and a resolution conversion/electronic zoom circuit (in the following, referred to as a "resolution conversion section") 16.

The imaging device 12 includes, for example, an X-Y addressing type CMOS (Complementary Metal Oxide Semiconductor) image sensor, etc., converts the light from an object of shooting, which is captured through the lens 11, into an electronic signal, and outputs the analog image signal obtained by the conversion to the A/D converter 13.

The A/D converter 13 converts the analog image signal from the imaging device 12 into a digital image signal, and outputs the obtained digital image signal to the signal processing circuit 14.

The signal processing circuit 14 performs camera signal processing, such as gamma correction, color balance adjustment, etc., on the image signal supplied from the A/D converter 13, and outputs a luminance signal and a color-difference signal as an 8-bit image signal, respectively.

The control section 15 specifies the effective range of the input image in accordance with the camera shake compensation and electronic zooming to the resolution conversion section 16. Also, the control section 15 appropriately specifies a read-start position to the imaging device 12. As described below, data is not read from the uppermost block (a bunch of pixels) of the imaging device 12, but is read from the block located lower than that as the starting position depending on the expansion rate of the electronic zooming.

The resolution conversion section 16 extracts only the necessary image data in accordance with the effective range information from the control section 15, and outputs the image signal (video signal), which has been converted into the resolution of the output image.

FIG. 5 is a block diagram illustrating an example of the detailed configuration of the resolution conversion section 16.

The resolution conversion section 16 includes a horizontal-resolution conversion circuit 21, an image memory 22, and a vertical-resolution circuit 23.

The horizontal-resolution conversion circuit 21 is placed at the front stage of the image memory 22, extracts only the effective range specified by the control section 15 with respect to the lateral direction, namely the horizontal direction, of the input image from the signal processing circuit 14, and converts the image into the resolution of the output image by interpolation calculation. The processing is performed for each line. When the processed line is in the effective range, the horizontal-resolution conversion circuit 21 writes the data of that line into the image memory 22.

The vertical-resolution conversion circuit 23 is placed at the back stage of the image memory 22, reads the data of the line in the effective range specified by the control section 15 from the image memory 22, performs the resolution conversion to have the resolution of the output image by interpolation calculation with respect to the vertical direction, and outputs the data.

The image memory 22 includes a semiconductor memory device, for example, such as a DRAM, etc., and temporarily stores the input image data, which has been subjected to the horizontal resolution conversion to have the same resolution as the horizontal resolution of the output image by the horizontal-resolution conversion circuit 21. For example, the capacity of the image memory 22 is determined to be the capacity capable of storing the data of (X*Y)

where X=the resolution of the output image in the lateral direction, and Y=one half of the number of lines of the input image in the vertical direction+margin (about 10%).

Accordingly, it is not possible to write the entire input image data of one screen into the image memory 22. Thus, in the image display apparatus 1, before the completion of the writing of the image data for one screen into the image memory 22, the reading of the image data for that one screen is started. That is to say, the input image is continuously input in accordance with the synchronization signal for each constant period V in the same manner as before. However, the output image is continuously output with a (1/2)V delay from the input image for each constant period V.

Here, a description will be given of an example of the operation by the image display apparatus 1 with reference to FIG. 6, which is a timing chart showing the address transition of the image memory for consecutive two screens and the input/output timing of the images when all the screens are displayed (when all the images of the blocks 1 to 7 are directly output).

Figure 6:
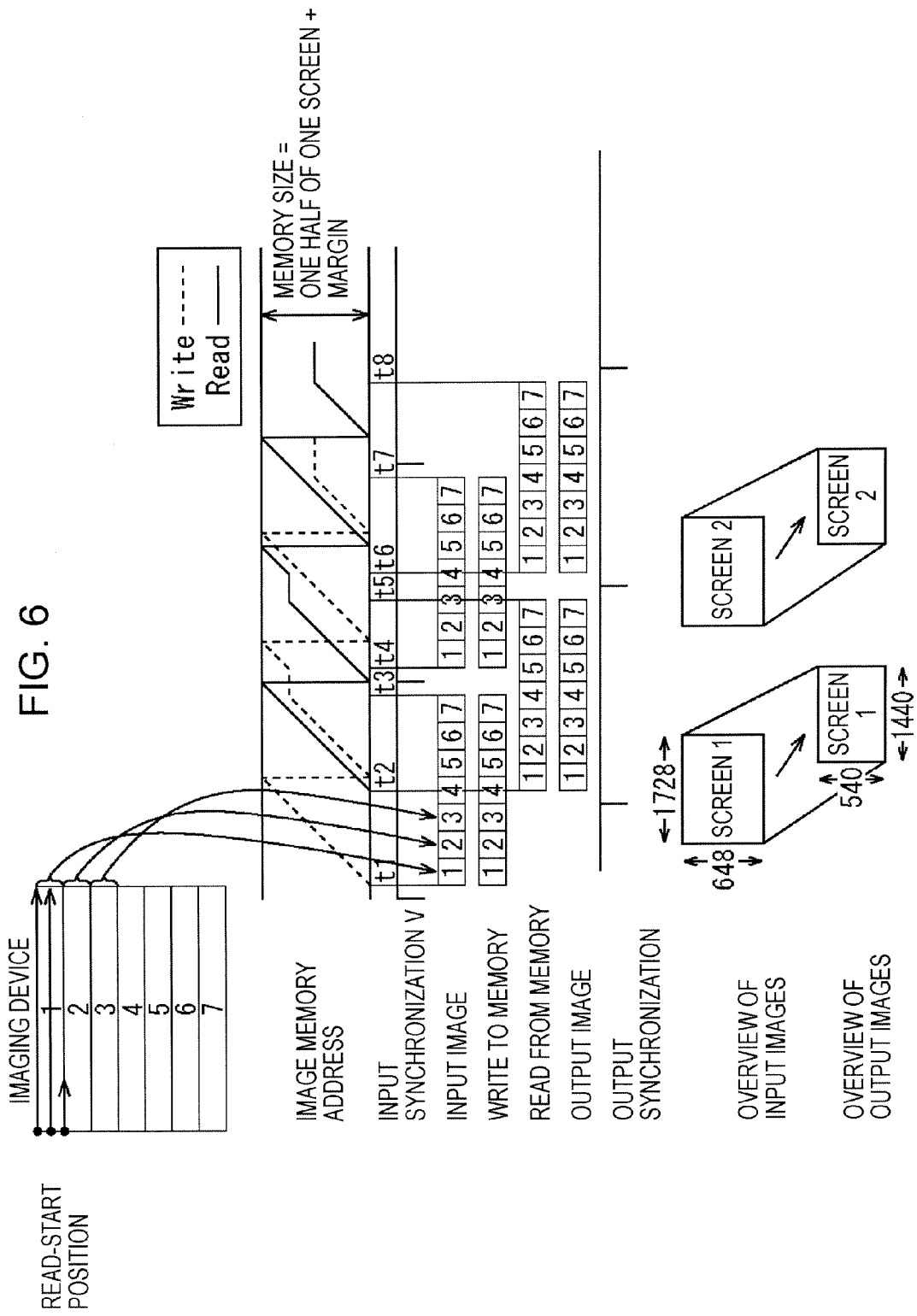
FIG. 6 is a timing chart showing the address transition of an image memory and the input/output timing of images for illustrating an operation of the present invention.

The example in FIG. 6 shows the state in which the input image of horizontal 1728 pixels×vertical 648 lines is converted into an output image of horizontal 1440 pixels×vertical 540 lines. A description will be given by dividing each block into 7 blocks, and the individual blocks are assumed to be the blocks 1 to 7.

The image memory 22 includes a ring buffer, the writing of data into the image memory 22 is denoted by broken lines, and the reading of the data from the image memory 22 is denoted by solid lines.

The address of the image memory 22 starts from 0, and the write address of the next line is obtained by incrementing for one line for each writing of one line. When the address reaches the end of the image memory, the write address of the next line is returned to 0 as shown in the figure, and then the write address is continued to be incremented for one line for each writing of one line again. The address to be the location of writing data is held after the completion of the processing for one screen (blocks 1 to 7), and the processing of the next screen is continued from the held address.

As shown in FIG. 6, the input image obtained by reading in sequence from the line of the block 1 of the imaging device 12 is continuously input for each constant period V in accordance with the synchronization signal. The output synchronization signal is not in synchronism with the input synchronization signal. In this example, the output image is continuously output with a (1/2)V delay from the input image for each constant period V.

The input image data of the screen 1 is subjected to the resolution conversion in sequence from the lines constituting the block 1 of the uppermost part of the screen by the horizontal-resolution conversion circuit 21, and the image data whose resolution has been converted is written in the address of the image memory 22 in sequence for each line.

In FIG. 6, when the entire input image data of the screen 1 is written into the image memory 22 during the time period from t1 to t3, for example, the image data located in the lines of the lower half of the input image data to be written is overwritten onto the image data of the lines written previously, because the capacity of the image memory 22 in the vertical direction is only about one half of the number of lines of the input image data.

Thus, as shown in FIG. 6, in the image display apparatus 1, at time t2, when (1/2)V has passed from the image input before the completion of the writing of the entire input image data of the screen 1 into the image memory 22, the vertical-resolution conversion processing of the input image data of the screen 1 by the vertical-resolution conversion circuit 23 is started.

From a predetermined line lower than the uppermost line of the input image data, which has been already written in the image memory 22 in the (1/2)V period, is subjected to the vertical-resolution conversion processing. Thus, it is possible to output the image having the same resolution as the vertical resolution of the output image before the first half of the input image data disappears by being overwritten by the second half of the input image data.

In FIG. 6, the input image data of the screen 1 is read by the vertical-resolution conversion circuit 23 during the time period t2 to t5. The writing of the input image data of the screen 2 is started by the horizontal-resolution conversion circuit 21 at time t4 in that time period.

Similarly, the image data of the screen 2 is read at time t6, when (1/2)V has passed from the input of the image data of the screen 2, and after that, the next screen, the screen 3 (not shown in the figure), is written and read in sequence.

In this regard, the write speed of the input image data at the time of displaying all screens and the read speed are the same, so that the write processing of the image data will not get ahead of the read processing.

Next, referring to FIG. 7, a description will be given of an example of the operation when the camera shake compensation and the electronic zooming are performed.

Figure 7:
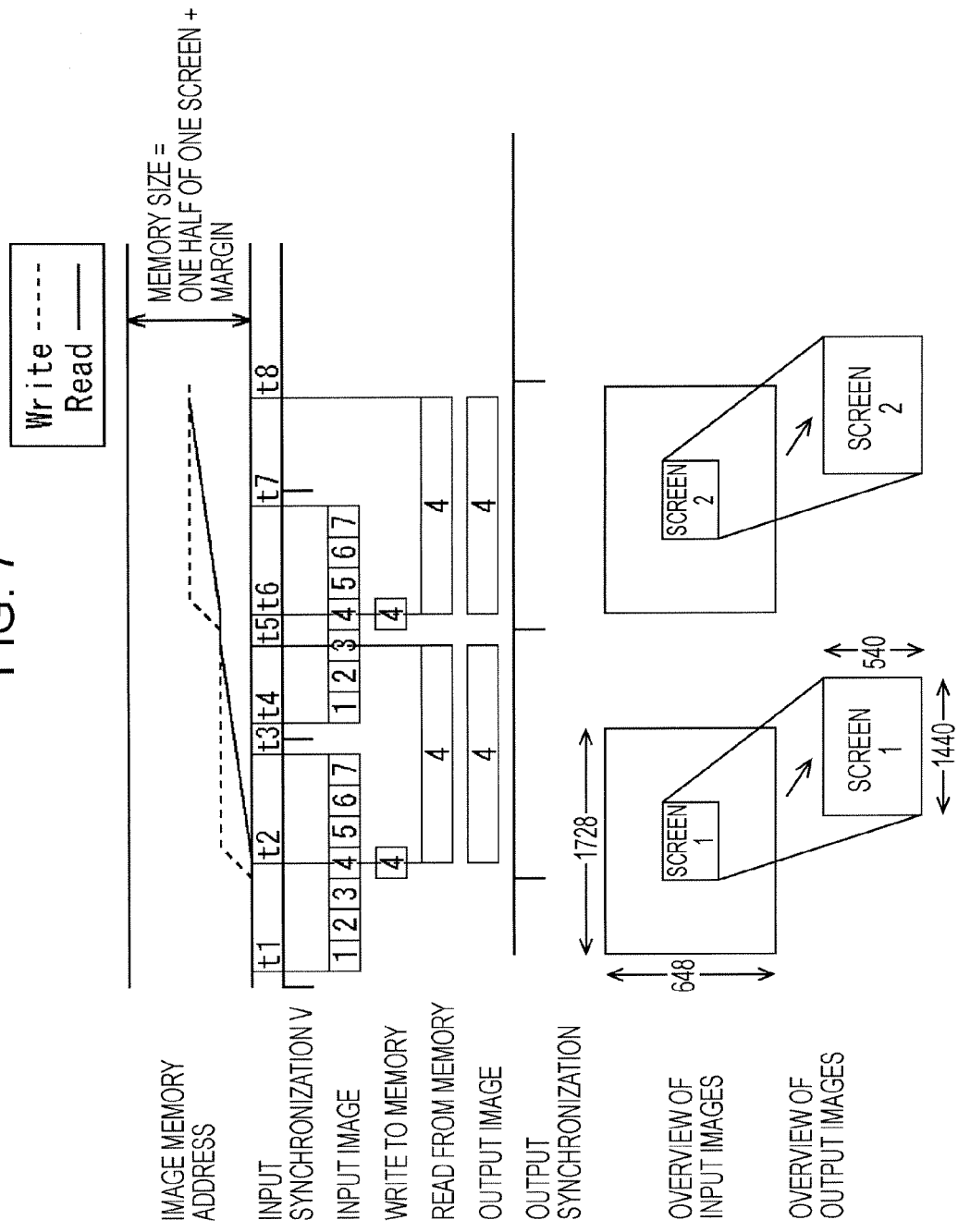
FIG. 7 is a timing chart showing the address transition of an image memory and the input/output timing of images for illustrating another operation of the present invention.

FIG. 7 shows a state in which the pixels included in the block 4 of the center of the screen is specified as an effective range from the input image of horizontal 1728 pixels×vertical 648 lines, and the image of the effective range is subjected to the resolution conversion to produce the output image including horizontal 1440 pixels×vertical 540 lines.

The horizontal-resolution conversion circuit 21 performs the resolution conversion on the input image data of the screen 1, which includes 1728 pixels per one line, to the data of 1440 pixels in accordance with the instruction by the control section 15. When the line, which has been subjected to the resolution conversion, is included in the effective range in the vertical direction specified by the control sentence 15, the horizontal-resolution conversion circuit 21 writes the converted data into a predetermined address in the image memory 22 (time t1 to t3).

In this regard, the write address starts from 0, and the write address of the next line is obtained by incrementing for one line for each writing of one line. The address to be the location of writing data is held after the completion of the processing for one screen, and the writing of the data of the screen 2, namely the next screen, is continued from the held address.

The vertical-resolution conversion circuit 23 starts the processing at time t2, when (1/2)V has passed from the input of the image data of the screen 1. While the time period, (1/2)V, passes, the horizontal-resolution conversion of the block 4 is completed, and the obtained data is written in the image memory 22.

The vertical-resolution conversion circuit 23 starts the reading of the data in the line to be processed at time t2, converts the resolution of the read data to vertical-output resolution 540, and outputs the data. At this time, the read address from the image memory 22 is set in consideration that only the lines in the effective range have been written in the image memory 22.

In FIG. 7, the input image data of the screen 1 is read by the vertical-resolution conversion circuit 23 during the time period t2 to t5. The writing of the input image data of the screen 2 is started by the horizontal-resolution conversion circuit 21 at time t4 in that time period.

Similarly, the image data of the screen 2 is read at time t6, when (1/2)V has passed from the input of the image data of the screen 2, and after that, the next screen, the screen 3 (not shown in the figure), is written and read in sequence.

As a result of the above, the portion in the effective range of the input image is converted to the image having the same resolution as the output image, and is output with a (1/2)V delay from the input image as an output image.

By writing data into the image memory 22 and reading data from the image memory 22, it becomes possible to reduce the memory capacity to about one half compared with a known image memory having a necessary capacity of one screen (field or frame) for the sake of the camera shake compensation and the electronic zooming without deteriorating the image quality and adding the compression/expansion circuits. That is to say, it is possible to miniaturize the image memory 22 and to reduce the cost.

In this regard, in the above, the beginning line of the effective range is limited to the line upper than one half (1/2) of the input screen, because the output image is output with a (1/2)V delay from the input image. However, this is not a problem in particular, because the effective screen is virtually set in the vicinity of the center of the screen for the camera shake compensation and the electronic zooming of a video camera.

Also, the output delay timing of the output image with respect to the input image is not limited to the above-described (1/2)V, and may be earlier of later than this. In the former case, the memory capacity can be further reduced. Since the memory capacity is requested to be further reduced, for example, the output delay timing can be set to (1/3)V, and the capacity of the image memory 22 can be about one third of the known capacity capable of recording the entire one screen.

Figure 8:
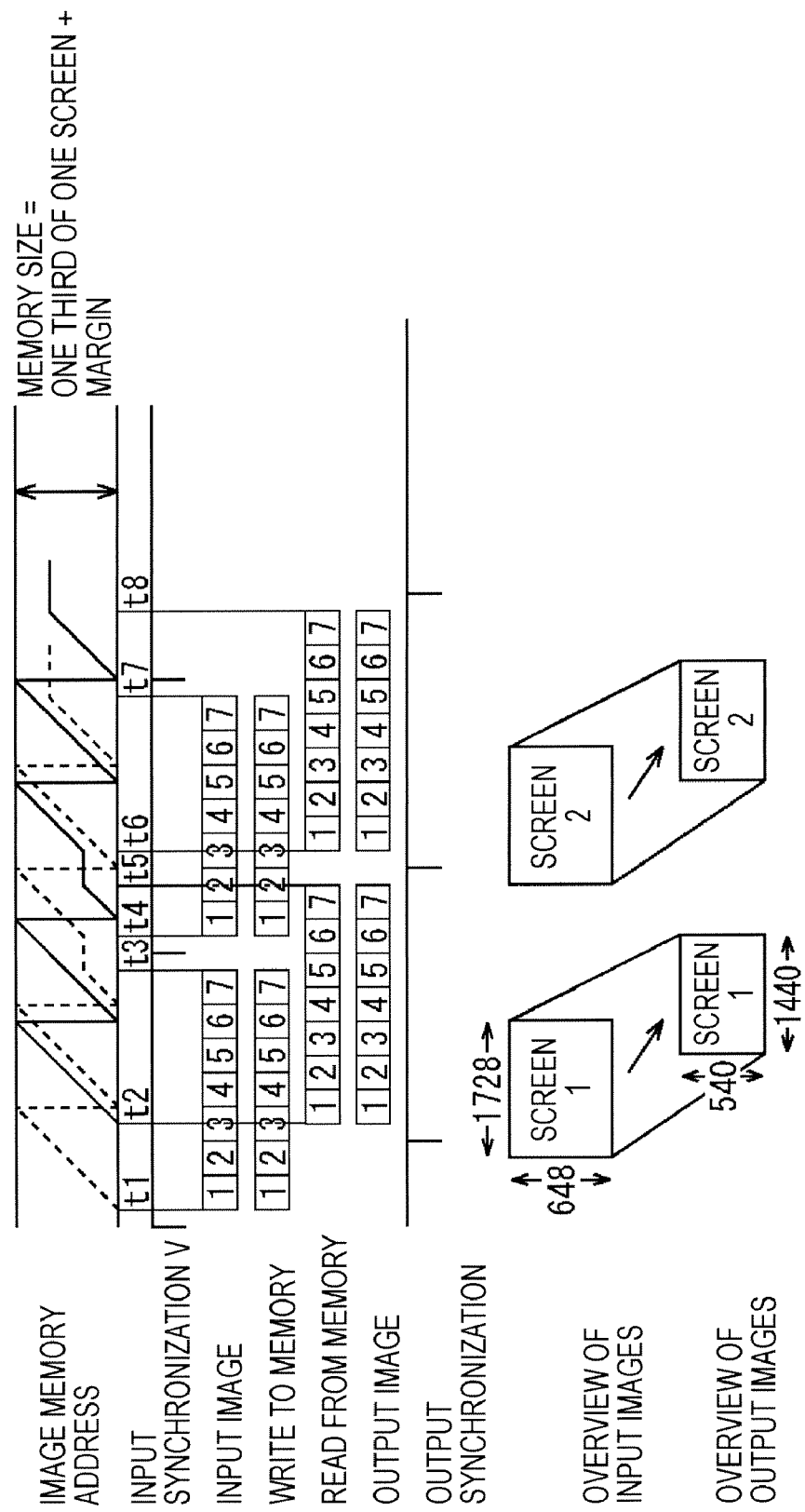
FIG. 8 is a timing chart showing the address transition of an image memory and the input/output timing of images for illustrating still another operation of the present invention.

FIG. 8 is a diagram showing the address transition of the image memory 22 and the timing when the output delay timing is set to (1/3)V.

FIG. 8 shows a state of converting the resolution from an input image of horizontal 1728 pixels×vertical 648 lines into an output image of horizontal 1440 pixels×vertical 540 lines.

As shown in FIG. 8, the input image obtained by reading in sequence from the lines of the block 1 of the imaging device 12 is continuously input for each constant period V in accordance with the synchronization signal. Also, the output synchronization signal is not in synchronism with the input synchronization signal. In this example, the output image is continuously output with a (1/3)V delay from the input image for each constant period V.

That is to say, as shown in FIG. 8, in the image display apparatus 1, at time t2, when (1/3)V has passed from the image input before the completion of the writing of the entire input image data of the screen 1 into the image memory 22, the vertical-resolution conversion processing of the input image data of the screen 1 by the vertical-resolution conversion circuit 23 is started.

From a predetermined line lower than the uppermost line of the input image data, which has been already written in the image memory 22 in the (1/3)V time period is subjected to the vertical-resolution conversion processing. Thus, it is possible to output the image having the same resolution as the vertical resolution of the output image before the first one third of the input image data disappears by being overwritten by the rest of the input image data.

In FIG. 8, the input image data of the screen 1 is read by the vertical-resolution conversion circuit 23 during the time period t2 to t5. The writing of the input image data of the screen 2 is started by the horizontal-resolution conversion circuit 21 at time t4 in that time period.

Similarly, the image data of the screen 2 is read at time t6, when (1/3)V has passed from the input of the image data of the screen 2, and after that, the next screen, the screen 3 (not shown in the figure), is written and read in sequence.

Figure 9:
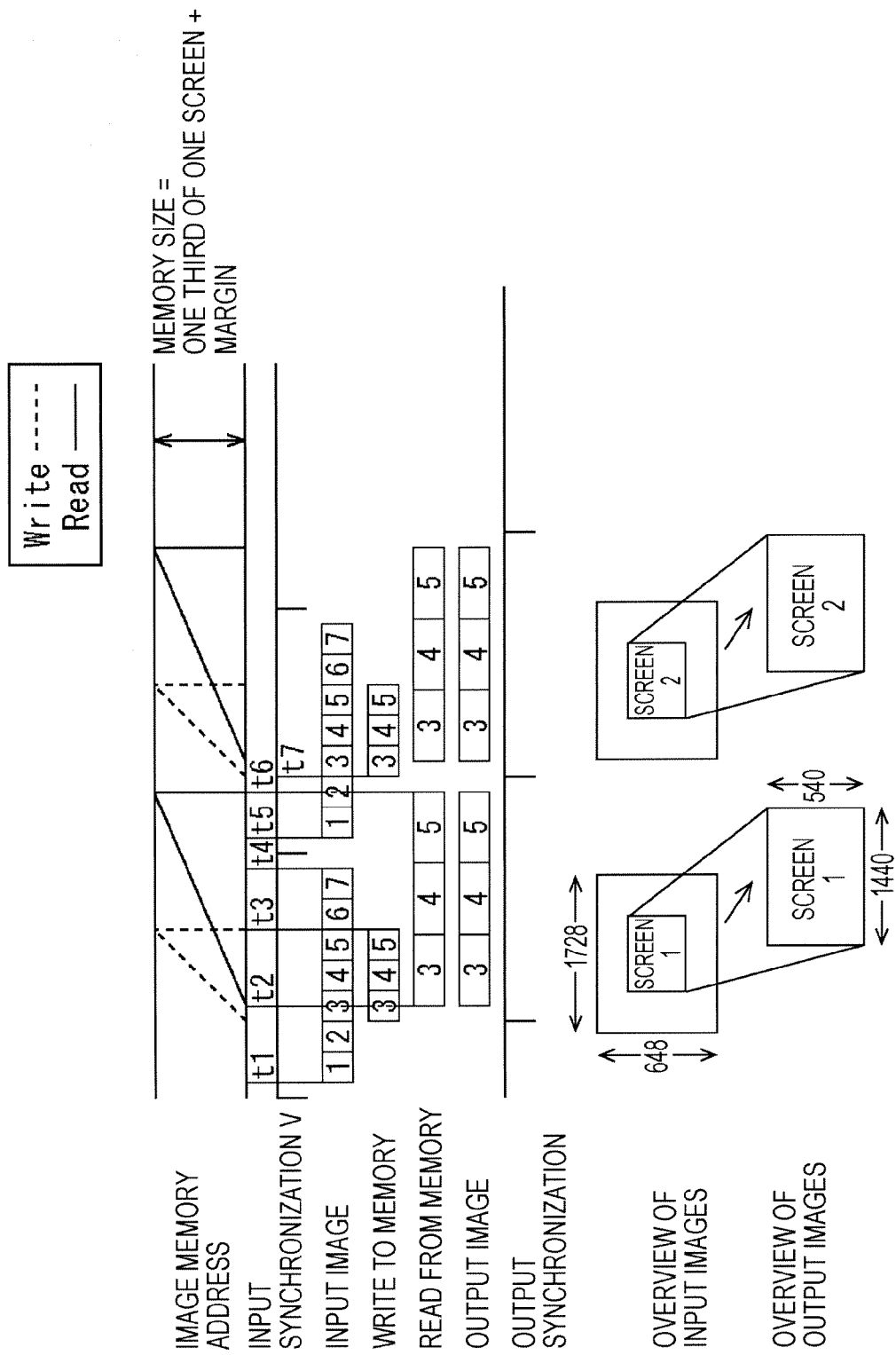
FIG. 9 is a timing chart showing the address transition of an image memory and the input/output timing of images for illustrating still another operation of the present invention.

FIG. 9 is another diagram showing the address transition of the image memory 22 and the timing when the output delay timing is set to (1/3)V.

FIG. 9 shows a state in which the pixels included in the blocks 3 to 5 of the center of the screen is specified as an effective range from the input image of horizontal 1728 pixels×vertical 648 lines, and the image of the effective range is subjected to the resolution conversion to produce the output image including horizontal 1440 pixels×vertical 540 lines.

The horizontal-resolution conversion circuit 21 performs the resolution conversion on the input image data of the screen 1, which includes 1728 pixels per one line, to the data of 1440 pixels in accordance with the instruction by the control section 15. When the line, which has been subjected to the resolution conversion, is included in the blocks 3 to 5, which is the effective range in the vertical direction specified by the control sentence 15, the horizontal-resolution conversion circuit 21 writes the converted data into a predetermined address in the image memory 22 (time t1 to t4).

In this regard, the write address starts from 0, and the write address of the next line is obtained by incrementing for one line for each writing of one line. In this example, the address to be the location of writing the next data becomes 0 when the processing for one screen is completed, and the processing of the next screen (the screen 2), namely the next screen, is continued from the held address.

The vertical-resolution conversion circuit 23 starts the processing at time t2, when (1/3)V has passed from the input of the image data of the screen 1. While the time period, (1/3)V, passes, the horizontal-resolution conversion of the block 3 is completed, and the obtained data is written in the image memory 22. The vertical-resolution conversion circuit 23 performs the resolution conversion on the read data to the data of the vertical resolution 540 and the outputting as far as the last line of the block 5 by time t6.

Similarly the image data of the screen 2 is read at time t7, when (1/3)V has passed from the input of the image data of the blocks 3 to 5 of the screen 2, and after that, the next screen, the screen 3 (not shown in the figure), is written and read in sequence.

Incidentally, as described above, the maximum expansion rate of the electronic zoom decreases by making the delay of the output image from the input image smaller than (1/2)V. This is because when the delay is (1/2)V, it is possible to convert the resolution of only the block 4, and to output it, whereas when the delay is (1/3)V, since the reading from the image memory 22 is carried out in accordance with the output synchronization signal, it is not possible to convert the resolution of only the block 4 because of timing, and thus the resolutions of the blocks 3 to 5 are converted and output. When the resolution and the size of the output image after expansion is the same, the maximum expansion rate becomes higher if a smaller-range image is expanded.

Accordingly, in the image display apparatus 1, the read-start position of the imaging device 12 is changed, and thus it is possible to obtain the same expansion rate of the electronic zoom when the delay is (1/3)V as that of when the delay is (1/2)V.

Figure 10:
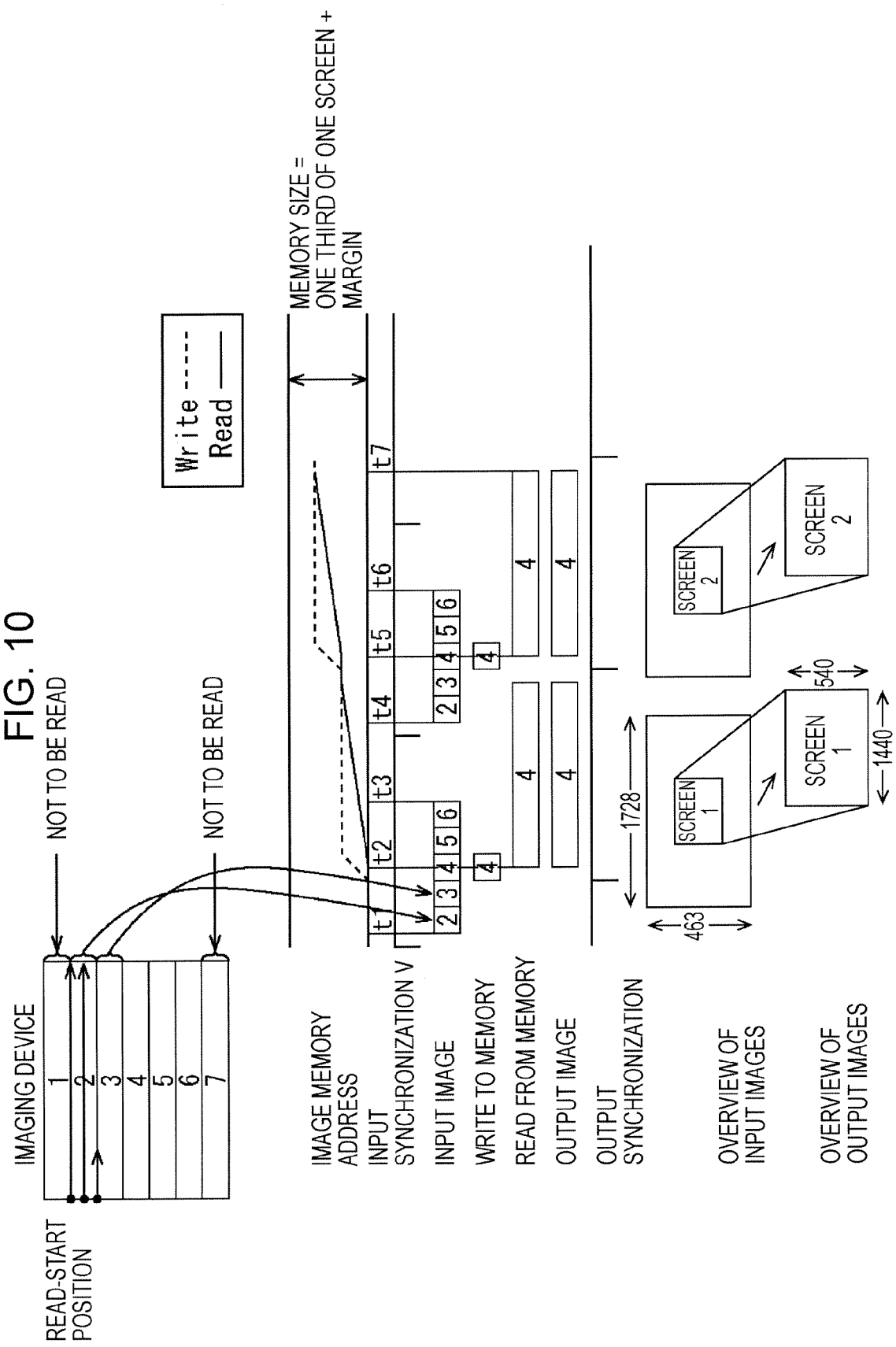
FIG. 10 is a timing chart showing the address transition of an image memory and the input/output timing of images for illustrating still another operation of the present invention.

FIG. 10 is a diagram showing the address transition of the image memory 22 and the timing when the central portion (block 4) is converted into an image having the same resolution as the output resolution.

From the state without the electronic zoom to the sate of expanding using the data of the blocks 3 to 5, as shown in FIGS. 7 and 9, the read-start position of the imaging device 12 is the block 1. In contrast, when the block of the data to be used for expansion is only the block 4 and the expansion rate of the electronic zoom is greater than that, the read-start position of the imaging device 12 is changed to the block 2 as shown in FIG. 10.

Thus, the input timing of the image (the block 4 to be expanded) becomes earlier. It becomes possible to read only the block 4 from the image memory 22 in accordance with the output synchronization signal, and to expand only the block 4.

In this regard, in FIG. 10, the blocks 1 and 7 are not read among individual blocks, and only the blocks 2 to 6 therebetween are read from the imaging device 12.

As described above, the imaging device 12 is, for example an X-Y addressing type CMOS, and thus it is possible to read only a pixel value having a predetermined address in an X-axis direction and a Y-axis direction, and thus it becomes possible to change the read-start position in accordance with the range to be expanded in this manner.

When the imaging device 12 is an imaging device (CMOS sensor, etc.) of a rolling shutter method, if the read-start position of the imaging device 12 is changed as described above, the maximum exposure time at the time of changing (at transition time) is also changed.

Figure 11:
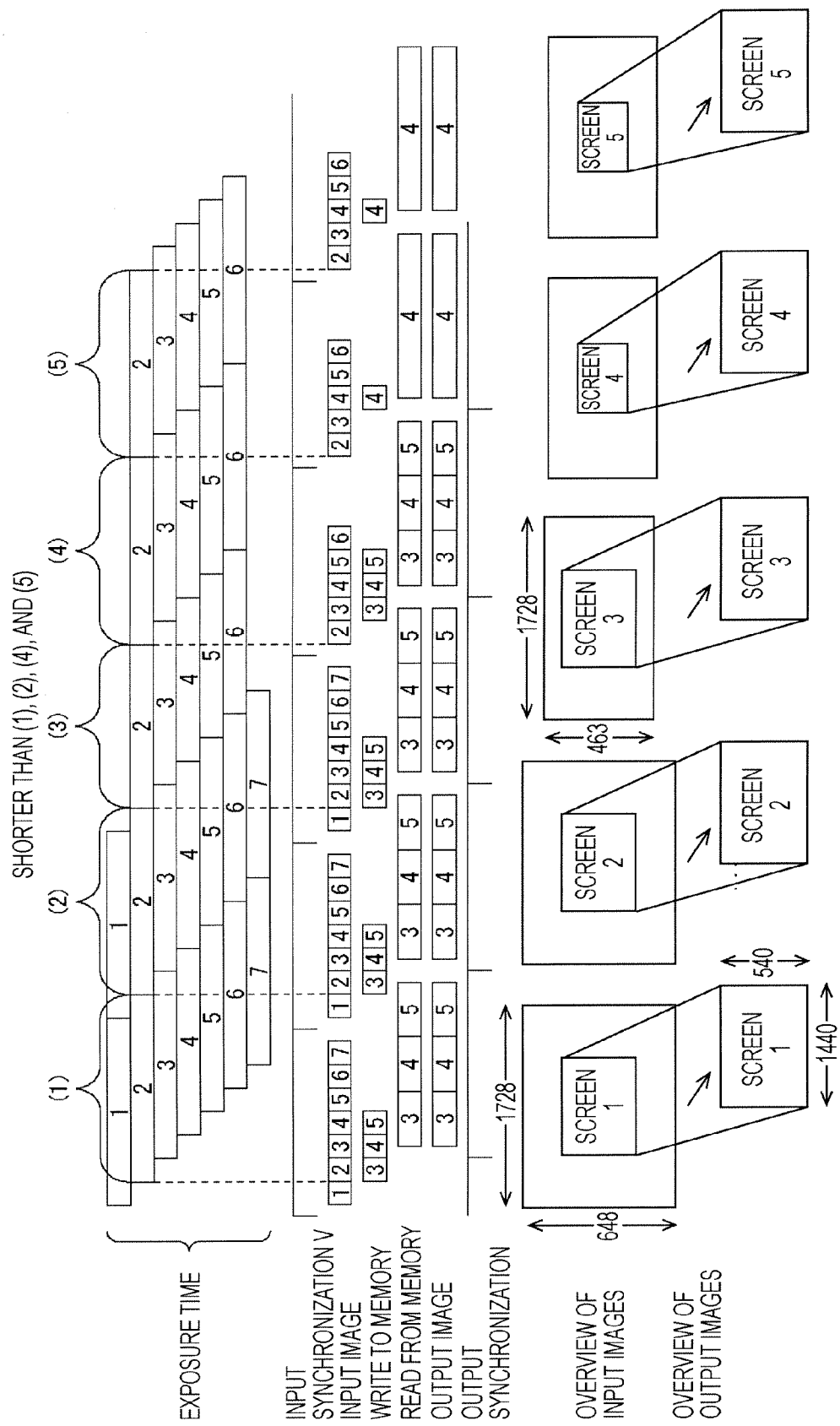
FIG. 11 is a diagram showing the case where the maximum exposure time becomes shorter by a transition of lowering a read-start position.

FIG. 11 is a diagram illustrating the case where the maximum exposure time becomes shorter by the transition of lowering the start position of reading (the transition to expand the expansion rate of the electronic zoom greater than usual (the range within which the blocks 3 to 5 read from the image memory 22 can be expanded)).

In FIG. 11, the maximum exposure time (3) at transition time is shorter than the maximum exposure time (1), (2), (4), and (5) before and after the transition. Accordingly, in this case, for a method of obscuring the influence by the change of the maximum exposure time on the output image, a method of controlling the maximum exposure time before and after the transition by the control section 15 is considered.

Figure 12:
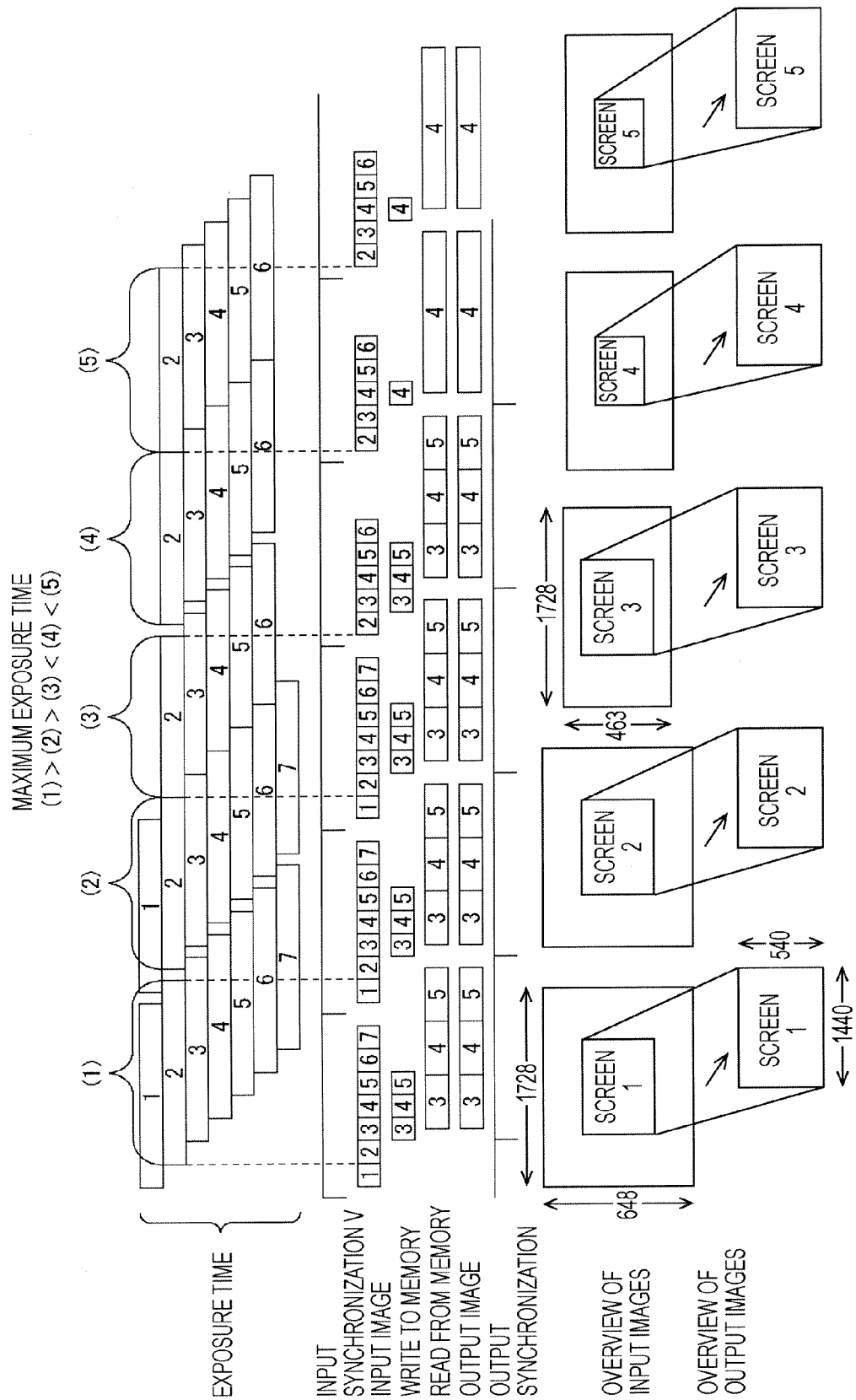
FIG. 12 is a diagram showing an example of controlling the maximum exposure time.

FIG. 12 is a diagram showing an example in which the maximum exposure time (2) and (4) before and after the transition is controlled to be an intermediate time period of the maximum exposure time at normal time, namely (1) and (5), and the maximum exposure time (3) at transition time, because the maximum exposure time (3) at transition time becomes shorter.

In this manner, it is possible to prevent an abrupt change of the maximum exposure time at the transition time of the read start position, and to obscure the influence of the change of the maximum exposure time occurring in the output image by controlling the maximum exposure time before and after the transition.

Figure 13:
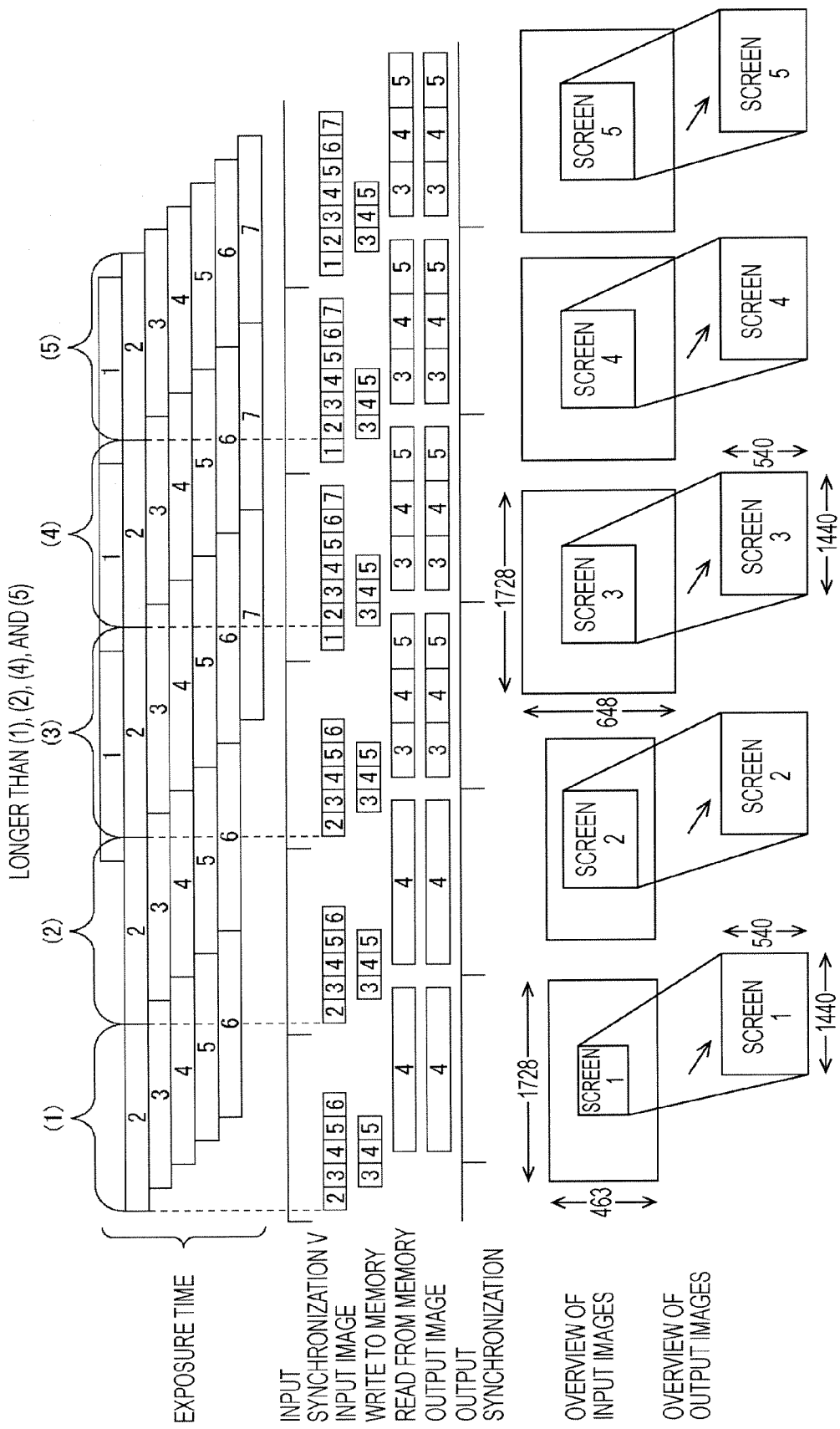
FIG. 13 is a diagram showing the case where the maximum exposure time becomes longer by a transition of raising a read-start position.

FIG. 13 is a diagram showing the case where the maximum exposure time becomes longer by the transition of raising a read-start position (the transition of the expansion rate of the electronic zoom from the expansion (the range within which the block 4 is expanded assuming that the read-start position of the imaging device 12 is the block 2) to usual).

In FIG. 13, the maximum exposure time (3) at the transition time is longer than the maximum exposure time (1), (2), (4), and (5) before and after the transition. Accordingly, in this case, for a method of obscuring the influence by the change of the maximum exposure time on the output image, a method of controlling the maximum exposure time before and after the transition by the control section 15 is considered.

Figure 14:
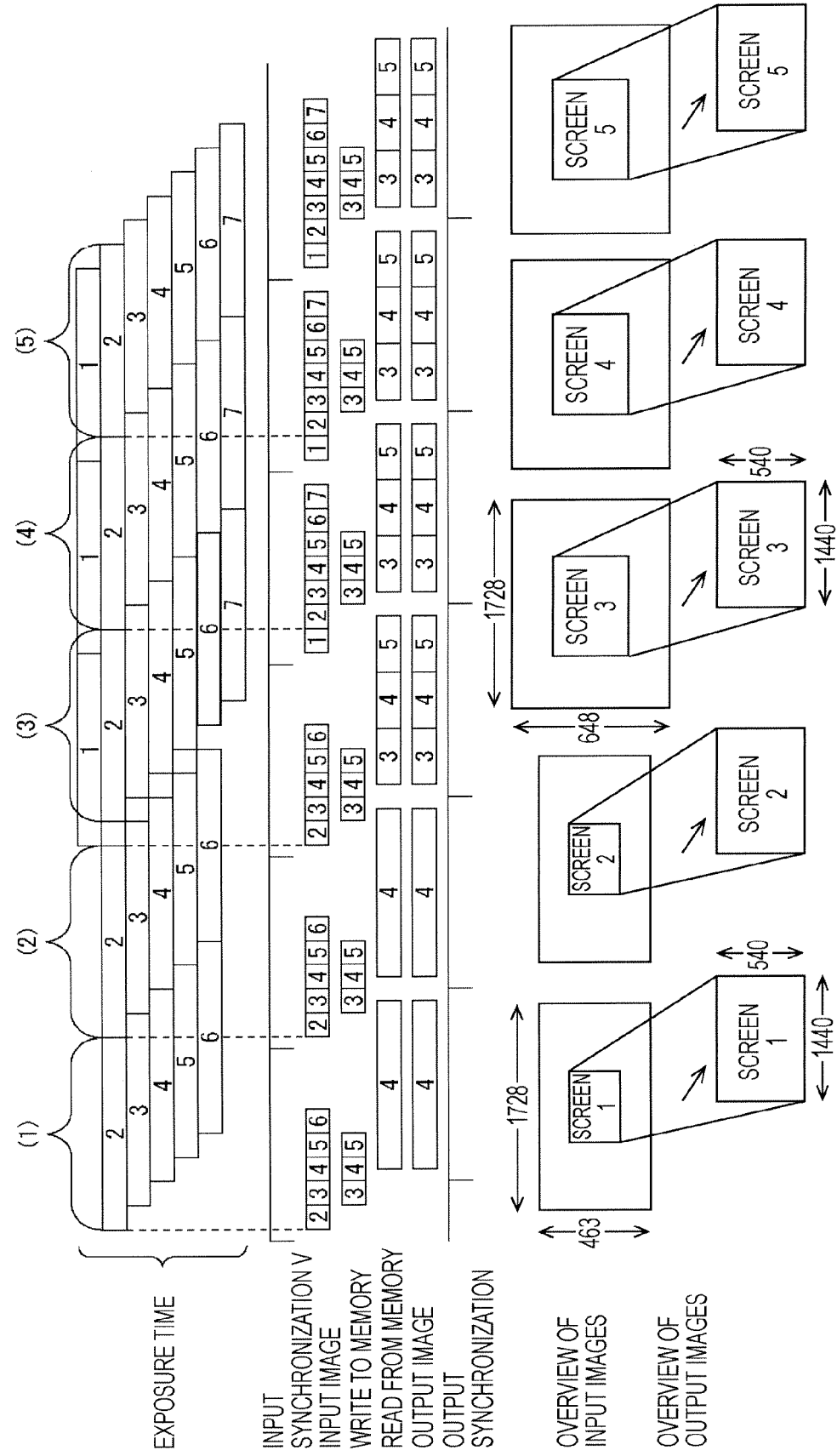
FIG. 14 is a diagram showing an example of controlling the maximum exposure time.

FIG. 14 is a diagram showing an example in which the maximum exposure time (3) at transition time is controlled to be the same as the maximum exposure time at normal time, because the maximum exposure time (3) at transition time becomes longer.

In this manner, it is possible to prevent an abrupt change of the maximum exposure time at the transition time of the read-start position, and to obscure the influence of the change of the maximum exposure time occurring in the output image by controlling the maximum exposure time.

Figure 15:
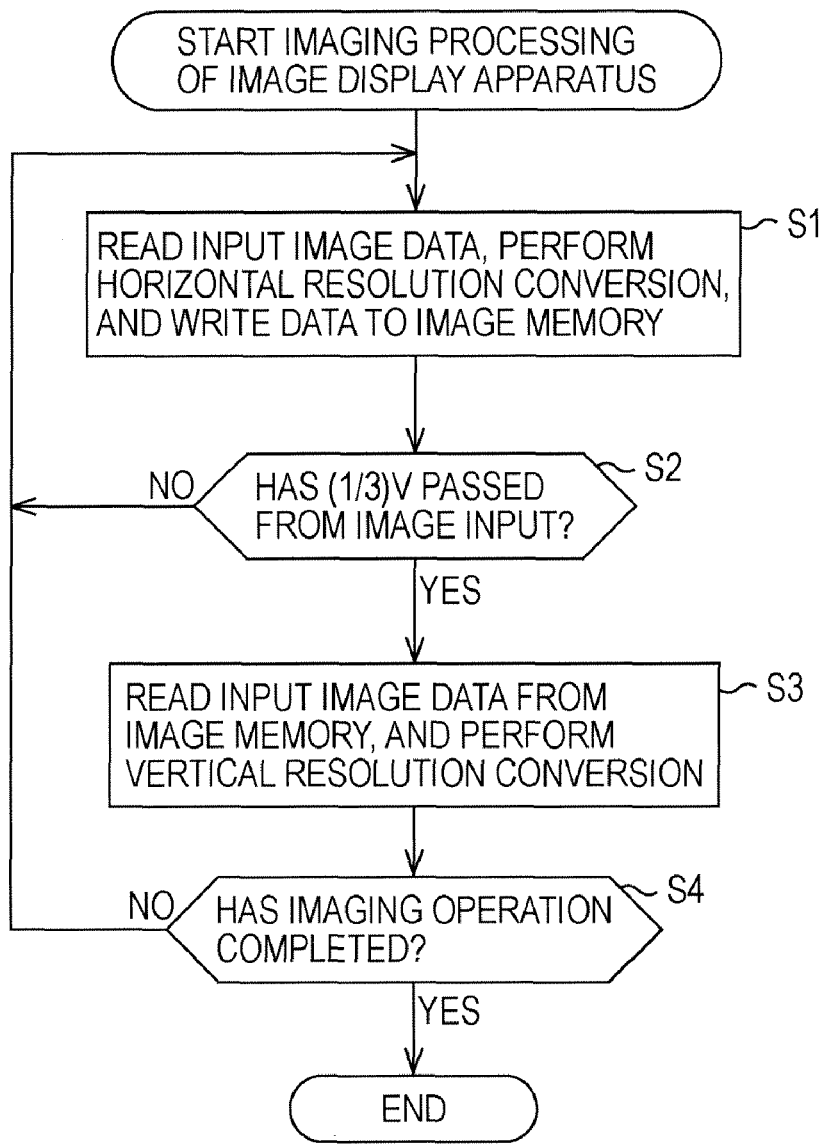
FIG. 15 is a flowchart illustrating imaging processing.

Referring to the flowchart in FIG. 15, a description will be given of the imaging processing of the image display apparatus 1.

In step S1, the horizontal-resolution conversion circuit 21 reads the input image data, performs the horizontal-resolution conversion, and writes the image data into the image memory 22.

In step S2, the control section 15 determines whether (1/3)V has passed from the image input, and repeats the processing to determine whether (1/3)V has passed from the image input. If it is determined that (1/3)V has passed from the image input, the processing proceeds to step S3, the vertical-resolution conversion circuit 23 reads the input image data from the image memory 22 under the control of the control section 15, and performs the vertical-resolution conversion.

The vertical-resolution conversion processing is performed from a predetermined line lower than the uppermost line of the input image data, which has been already written in the image memory 22 in the (1/3)V time period. Thus, it is possible to output the image having the same resolution as the vertical resolution of the output image before the first one third of the input image data disappears by being overwritten by the rest of the input image data.

In step S4, the control section 15 determines whether the image capturing operation by the user has completed. If it is determined that the image capturing operation by the user has not completed, the processing returns to step S1, the processing proceeds to the imaging processing of the next screen.

In step S4, if it is determined that the image capturing operation by the user has completed, the imaging processing is terminated.

By performing the above processing, the portion in the effective range of the input image is converted to the image having the same resolution as the output image, and is output with a (1/3)V delay from the input image as an output image. Accordingly, the capacity of the image memory 22 can be about one third of the known capacity capable of recording the entire one screen.

In this regard, the resolution of the input image data, the resolution of the output image data, the resolution of the effective range, etc., are not limited to the above-described examples. It is possible to appropriately change them in accordance with the specification, etc.

Also, a description has been given by taking a video camera as an example of the image display apparatus 1. However, the present invention is not limited to this, and the present invention can be applied to a moving image mode, etc., of a digital still camera, for example.

The above-described series of processing can be executed by hardware or can be executed by software. When the series of processing is executed by software, the programs constituting the software are built in a dedicated hardware of a computer. Alternatively, the various programs are installed, for example in a general-purpose personal computer capable of executing various functions from a program recording medium.

Figure 16:
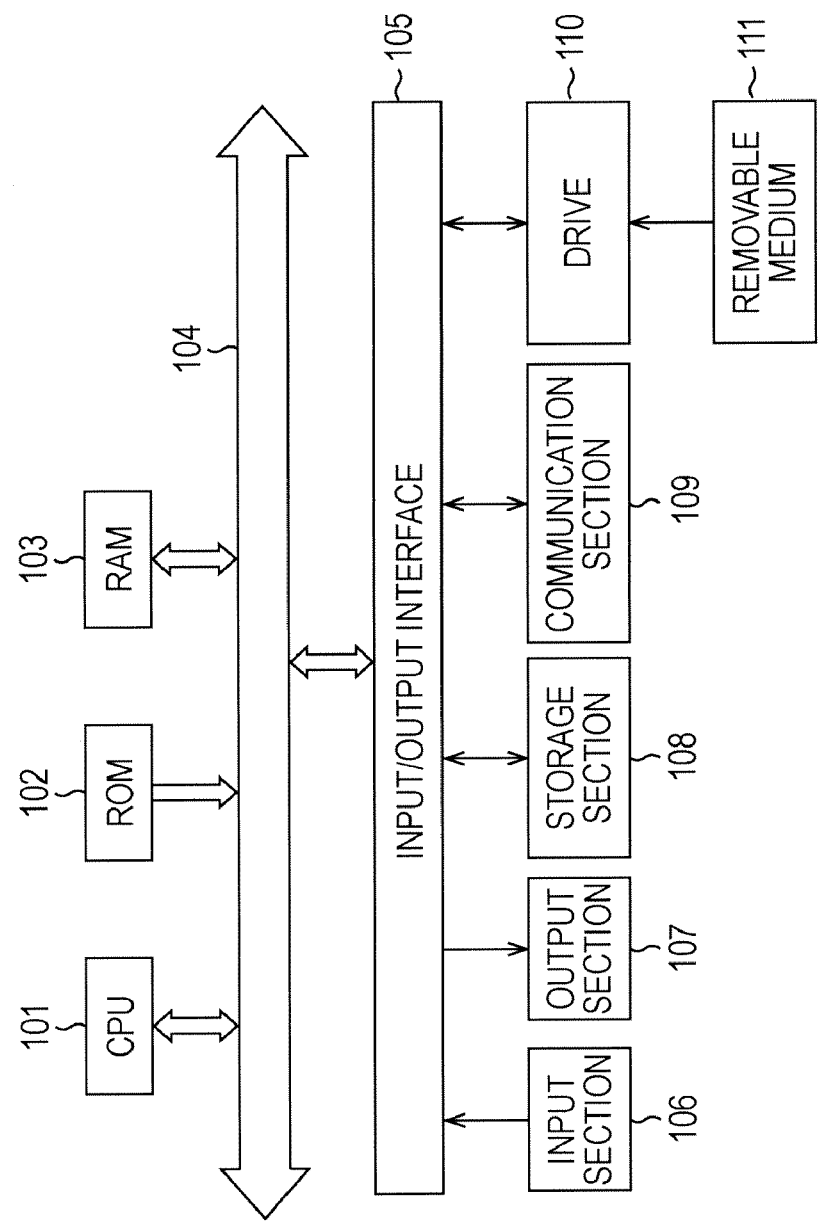
FIG. 16 is a block diagram showing an example of the configuration of a personal computer.

FIG. 16 is a block diagram illustrating an example of the configuration of a personal computer for executing the above-described series of processing.

A CPU (Central Processing Unit) 101 executes various kinds of processing in accordance with the programs stored in a ROM (Read Only Memory) 102 or a storage section 108. A RAM (Random Access Memory) 103 appropriately stores programs to be executed by the CPU 101, data, etc. The CPU 101, the ROM 102, and the RAM 103 are mutually connected with a bus 104.

An input/output interface 105 is also connected to the CPU 101 through the bus 104. An input section 106 including a keyboard, a mouse, a microphone, etc., and an output section 107 including a display, a speaker, etc., are connected to the input/output interface 105. The CPU 101 executes various kinds of processing in accordance with instructions input from the input section 106. The CPU 101 outputs the result of the processing to the output section 107.

The storage section 108 connected to the input/output interface 105 includes, for example a hard disk, and stores the programs executed by the CPU 101 and various kinds of data. A communication section 109 communicates with external apparatuses through a network such as the Internet, a local area network, etc.

When a removable medium 111, such as a magnetic disk, an optical disc, a magneto-optical disc, or a semiconductor memory, etc., is attached, a drive 110 connected to the input/output interface 105 drives the medium, and obtains the program and the data recorded there. The obtained program and data are transferred to the storage section 108 as necessary, and is stored there.

The program recording medium for storing the programs, which are installed in a computer and is executable by the computer, includes, as shown in FIG. 16, a removable medium 111 which is a package medium including, such as a magnetic disk (including a flexible disk), an optical disc (including a CD-ROM (Compact Disc-Read Only Memory) and a DVD (Digital Versatile Disc)), a magneto-optical disc, or a semiconductor memory, etc. Alternatively, the program recording medium includes a ROM 102 for storing the programs temporarily or permanently, a hard disk constituting the storage section 108, etc. The storage of the programs into the program recording medium is carried out through the communication section 109, which is an interface, such as a router, a modem, etc., as necessary, or using a wired or wireless communication medium, such as a local area network, the Internet, a digital satellite broadcasting, etc.

In this regard, in this specification, the steps describing the programs include the processing to be performed in time series in accordance with the described sequence as a matter of course. Also, the steps include the processing which is not necessarily executed in time series, but is executed in parallel or individually.

It should be understood by those skilled in the art that various modifications, combinations, sub-combinations and alterations may occur depending on design requirements and other factors insofar as they are within the scope of the appended claims or the equivalents thereof.

What is claimed is:

1. An image display apparatus having an electronic zoom function for expanding and displaying a part of an entire captured image, the image display apparatus comprising:
    imaging means for changing a start position of reading the image, the start position is a first position where reading of a screen of the image is performed;
    in order for at least a part of a predetermined range of data to be expanded and displayed based on a center of the entire image to be written at a time of reading the image from a memory, writing means for extracting the predetermined range of the data out of the image read by the imaging means and input as a capturing result, and for writing the extracted image in the memory;
    reading means for starting to read the image written in the memory by the writing means at the time of the reading of the image, for converting the predetermined range of the image read from the memory into an image of a predetermined resolution, and for outputting the image;
    when the range of the image read by the reading means is wider than the predetermined range, control means for controlling the start position of reading by the imaging means so as to narrow the range of the image to be read; and
    exposure-time control means for controlling maximum exposure time before and after a transition of the start position of reading the image by the imaging means.

2. The image display apparatus according to claim 1, wherein an input synchronization signal for an input image and an output synchronization signal for an image output by the reading means are asynchronous with each other, and assuming the input synchronization signal is V, the output synchronization signal is output with a (1/3)V delay with respect to the input synchronization signal.

3. A method of displaying an image in an image display apparatus having an electronic zoom function for expanding and displaying a part of an entire captured image, comprising the steps of:
    changing a start position of reading the image, the start position is a first position where reading of a screen of the image is performed;
    in order for at least a part of a predetermined range of data to be expanded and displayed based on a center of the entire image to be written at a time of reading the image from a memory, extracting the predetermined range of the image data out of the image read and input as a capturing result, and writing the extracted image in the memory;
    starting to read the image written in the memory at the time of the reading of the image, converting the predetermined range of the image read from the memory into an image of a predetermined resolution, and outputting the image;
    when the range of the image read is wider than the predetermined range, controlling the start position of reading the image so as to narrow the range of the image to be read; and
    controlling maximum exposure time before and after a transition of the start position of reading the image.

4. A non-transitory computer readable medium storing thereon a computer program for causing a computer to execute image processing in an image display apparatus having an electronic zoom function for expanding and displaying a part of an entire captured image, the image processing comprising the steps of:
    changing a start position of reading the image, the start position is a first position where reading of a screen of the image is performed;
    in order for at least a part of a predetermined range of data to be expanded and displayed based on a center of the entire image to be written at a time of reading the image from a memory, extracting the predetermined range of the image out of the image read and input as a capturing result, and writing the extracted image in the memory;
    starting to read the image written in the memory at the time of the reading of the image, converting the predetermined range of the image read from the memory into an image of a predetermined resolution, and outputting the image;
    when the range of the image read is wider than the predetermined range, controlling the start position of reading the image so as to narrow the range of the image to be read; and
    controlling maximum exposure time before and after a transition of the start position of reading the image.

5. An image display apparatus having an electronic zoom function for expanding and displaying a part of an entire captured image, the image display apparatus comprising:
    an imaging mechanism configured to change a start position of reading the image, the start position is a first position where reading of a screen of the image is performed;

in order for at least a part of a predetermined range of data to be expanded and displayed based on a center of the entire image to be written at a time of reading the image from a memory, a writing mechanism configured to extract the predetermined range of the image out of the image read by the imaging mechanism and input as a capturing result, and writing the extracted image in the memory;

a reading mechanism for starting to read the image written in the memory by the writing mechanism at the time of the reading of the image, converting the predetermined range of the image read from the memory into an image of a predetermined resolution, and outputting the image;

when the range of the image read by the reading mechanism is wider than the predetermined range, a control mechanism for controlling the start position of reading the image by the imaging mechanism so as to narrow the range of the image to be read; and an exposure-time control mechanism configured to control a maximum exposure time before and after a transition of the start position of reading the image by the reading mechanism.

* * * * *